Figure 1:
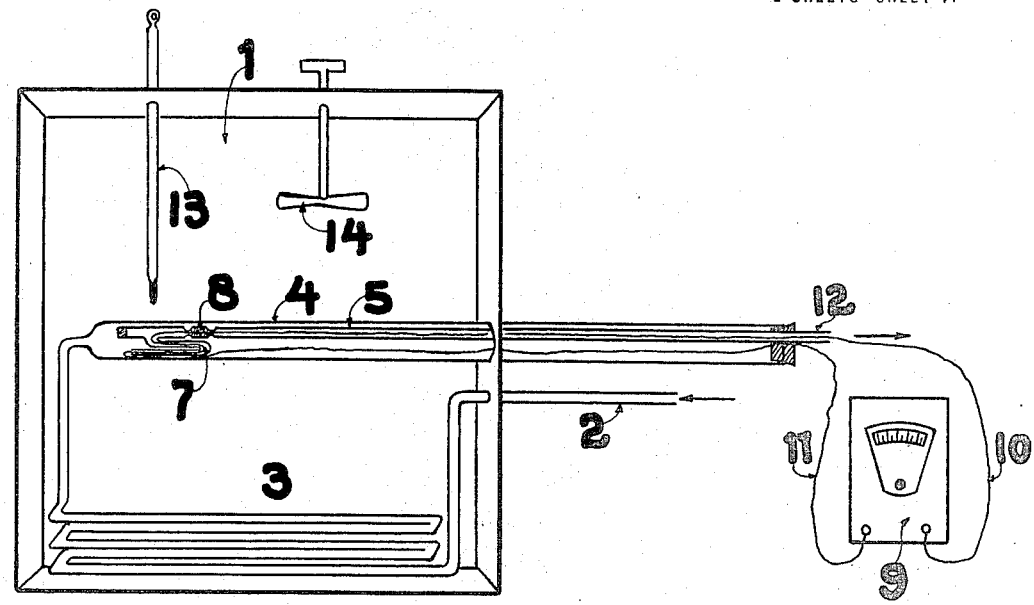
Figure 2:
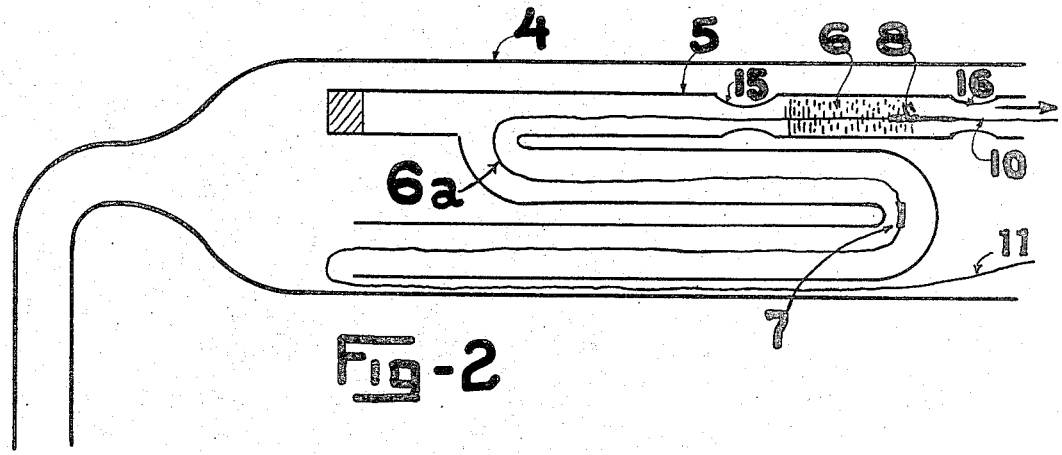

A. B. LAMB AND A. T. LARSON.
METHOD AND APPARATUS FOR TESTING GASES.
APPLICATION FILED FEB. 17, 1919.

1,321,063. Patented Nov. 4, 1919.

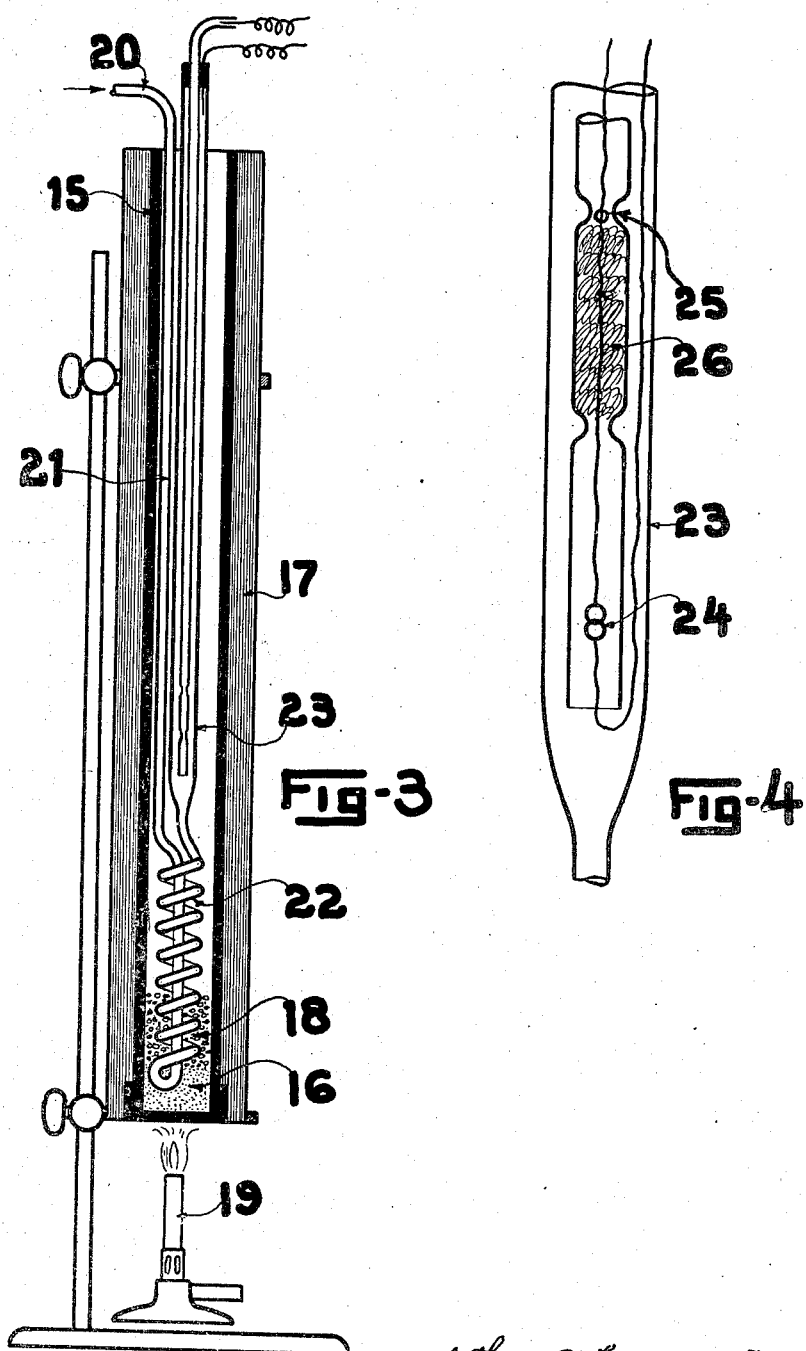

UNITED STATES PATENT OFFICE.

ARTHUR B. LAMB AND ALFRED T. LARSON, OF THE UNITED STATES ARMY.

METHOD AND APPARATUS FOR TESTING GASES.

1,321,063.  Specification of Letters Patent.  Patented Nov. 4, 1919.

Application filed February 17, 1919. Serial No. 277,599.

*To all whom it may concern:*

Be it known that we, ARTHUR B. LAMB, lieutenant colonel, and ALFRED T. LARSON, captain, Chemical Warfare Service, U. S. Army, citizens of the United States, residing in Washington, D. C., (whose post-office address is Cosmos Club, Washington, D. C.,) have invented certain new and useful Improvements in Methods and Apparatus for Testing Gases, of which the following is a specification.

This invention relates to method and apparatus for testing gases, and more particularly the quantitative determination of combustible gases, such as CO, in flue gases or gas-air mixtures.

One of the objects of this invention is to provide a method and apparatus for the quantitative determination of combustible gases, wherein catalytic material is employed in sufficient quantity, preferably in excess, to insure the complete burning of the combustible material of the gas under test.

Another object of this invention is to provide a method and means for the quantitative determination of combustible gases, the gases being first heated and then passed over a thermo-junction heated to a high temperature and then over another thermo-junction in the vicinity of material capable of catalyzing the combustion of said gases.

A further object of this invention is to provide a method and apparatus for bringing the gases to the thermo-junction at substantially the same temperature.

A still further object of this invention is to provide a method and means of ascertaining any change in electromotive force of the thermo-junctions, and more particularly any difference in potential between the thermo-junctions produced by the combustion of gases in the vicinity of one of the thermo-junctions, thereby affording a highly sensitive and accurate method and means of quantitative determination of gases.

The method employed in this invention is both differential and catalytic. When the combustible gas tested is CO, complete oxidation takes place at 250° C., or above, when in contact with the sufficient quantity of platinized platinum or other catalyst. The platinum required to insure complete combustion of a gas of given concentration and velocity is determined by experiment. Platinum, preferably in excess of this requirement, is employed in order to insure complete combustion in the event of a partial deterioration of the catalyst from impurities or other causes. For a given concentration of CO the total heat change will, therefore, remain constant if the velocity of the gas is also kept constant.

The method is rapid and convenient and is suitable for continuous observation of a gas current. This makes it peculiarly adapted for use in the study of gas absorbents, and information regarding the behavior of an absorbent can be ascertained from the instant a gas is turned into it.

Reference is to be had to the accompanying drawings in which certain parts of the apparatus are shown more or less diagrammatically.

Figure (1) shows the general arrangement of the oven for heating the gases, the conduit through which the gases are passed and the electrical measuring instrument.

Fig. (2) is a view showing on an enlarged scale the arrangement of the thermo-couple in the gas conduit and the position of the catalytic material in the conduit.

Fig. (3) shows a modified form of apparatus in which the gas under test is heated by means of the vapor of a high boiling liquid.

Fig. (4) is a view on an enlarged scale showing the arrangement of the thermo-couple and catalytic material in the gas conduit of the type of apparatus shown in Fig. (3).

The gases to be tested enter the oven (1) through the pipe (2) and pass through a coil (3). This coil may be of glass capable of withstanding high temperatures and having a low coefficient of expansion. It is usually built in the form of a grid which lies on the bottom of the oven. The gases on passing out of the coil (3) will have become heated to the temperature of the oven, and are then passed into the enlarged tube (4), which extends outward through the oven wall. Into this tube is fitted a smaller tube (5) which carries the catalyst (6) and thermo-junctions (7) and (8). The tubes (4) and (5) may be made of the same kind of material as coil (3).

The oven is usually kept at a fixed temperature and when electric heating means are used it is generally advisable to provide a regulatory device for maintaining the desired temperature.

The thermo-junctions (7) and (8) form part of a thermo-couple. The thermo-couple is preferably of copper and "constantan"

wires with silver soldered joints. Constantan is an alloy consisting of about 60% Cu, 40% Ni with traces of manganese. In this apparatus the constantan wire (6ª) is joined to the copper wires (10) and (11) at (8) and (7), respectively; but it is also possible to have the wire (6ª) of copper and wires (10) and (11) of constantan.

The thermo-junctions are substantially at the same potential at the same temperature, but when one of the junctions is heated higher than the other there will be a difference in potential between them. The test gases pass over the junction at (7), then through the catalyst (6) and then over the junction at (8). This catalyst consists, preferaly of platinum coated with platinum black. When the heated combustible gases come in contact with the catalyst they will burn and the temperature rise resulting from the combustion thereof is indicated by a measuring instrument, such as a galvanometer (9), connected to the thermo-junction by the wires (10) and (11). The non-combustible gases and products of combustion pass out of the tube (5) at (12).

The oven (11) is provided with a thermometer (13) for indicating the temperature thereof and also with a fan or stirrer (14) for circulating the air in the oven so that the temperature throughout the oven will be uniform.

The tube (5) is constricted at (15) and (16) and these constrictions help to keep the catalytic material at a definite place within the tube. It is also important to have the junctions (7) and (8) in practically the same cross-sectional plane in order to minimize any difference in temperature between the thermo-junctions that might result from any difference in temperature of the air surrounding tube (5) at (7) and that surrounding tube (5) at (8).

When gas is passed through the tube (5), if no combustible gas is present, the junction at (8) will be heated to the same temperature as that at (7) and galvanometer (9) will show no deflection. If CO or other combustible gas is present, the junction at (8) will increase in temperature as a result of the combustion in the contact mass. The difference in temperature between (7) and (8) will set up an electromotive force and this will produce a deflection in the galvanometer (9) which will be a measure of the concentration of the CO or other combustible substance in the gas if the rate of flow of the gas is controlled and kept uniform. It is desirable to calibrate the galvanometer (9) so that concentration of CO or other combustible gas may be obtained by direct reading. This is done by passing known concentrations of the gas through the catalyst.

In the modified form of apparatus shown in Figs. (3) and (4), a long tube 15, which may be of iron, silica or glass having a low coefficient of expansion, is fitted with a cap (16), usually of the same material, and covered with a heat insulator (17). A high boiling liquid, such as diphenylamin, at the bottom of the tube (15) is vaporized by heat supplied by the burner (19). The tube (15) performs the function of a reflux condenser, and the heat should be so supplied that the zone of condensation will reach near the top of the tube.

The gases to be tested are introduced at (20) and pass down tube (21), and then through coil (22) and into the tube (23). This tube (23) contains the thermo-couple comprising the junctions (24) and (25) and also the catalyst (26), and the general arrangement thereof will appear more clearly by reference to Fig. (4).

This apparatus operates substantially in the same manner as the apparatus in which the air oven is used. The vapor serves to heat the test gases as they pass through the spiral (22) and the gases leaving the spiral (22) are at substantially the same temperature as the vapor. The gases then pass first over the junction at (24), then through catalyst (26) and over the junction at (25).

It will be seen from the foregoing description that precise regulation of the temperature may be accomplished by this method and apparatus and that all of the combustible gas entering the apparatus is burned up while in contact with the catalyst and therefore made use of in heating one of the junctions of the thermo-couple, thereby avoiding operation with unnecessarily large quantities of gas. The quantity of gas passing through the apparatus may be ascertained and regulated by a flowmeter or similar device. Also, by this apparatus gases which have been previously subjected to purifying processes may be tested quantitatively.

It should be understood that this invention is not limited to the use of a single thermo-couple, but contemplates the use of a plurality of thermo-couples and also one or more thermo-piles where the particular conditions justify or demand such.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as indicated in the appended claims.

We claim:

1. In a method of quantitative determination of low concentrations of combustible gases, passing said gases over catalytic material in the vicinity of a thermo-junction.

2. In a method of quantitative determination of low concentrations of combustible gases, passing said gases over heated catalytic material in the vicinity of a thermo-junction.

3. In a method of quantitative determination of low concentrations of gases, heating said gases and passing same over catalytic material in the vicinity of a thermo-junction.

4. In a method of quantitative determination of low concentrations of gases, heating said gases and passing same over catalytic material in the vicinity of a thermo-junction, the said catalytic material being in sufficient amount to completely burn the combustible matter of the gases passing over same.

5. In a method of quantitative determination of low concentrations of gases, heating said gases and passing same over catalytic material in the vicinity of a thermo-junction, the said catalytic material being in excess of the amount necessary to completely burn the combustible matter of the gases passing over same.

6. In a method of quantitative determination of combustible gases, burning substantially all of said gases in the vicinity of a thermo-junction.

7. In a method of quantitative determination of combustible gases, burning substantially all of said gases with the aid of a catalyst in the vicinity of a thermo-junction.

8. In a method of quantitative determination of combustible gases, passing a known amount of said gases over heated catalytic material in the vicinity of a thermo-junction.

9. In a method of quantitative determination of combustible gases, passing a known amount of said gases over heated catalytic material in the vicinity of a thermo-junction, the said catalytic material being in sufficient amount to completely burn the combustible matter of the gases passing over same.

10. In a method of quantitative determination of combustible gases, burning substantially all of a known amount of said gases with the aid of a catalyst in the vicinity of a thermo-junction.

11. In a method of quantitative determination of low concentrations of combustible gases, measuring the temperature produced by the burning of said gases with the aid of a catalyst.

12. In a method of quantitative determination of low concentrations of combustible gases, measuring the change in electromotive force produced in electric conductor by the burning of said gases in the vicinity of said conductor.

13. In a method of quantitative determination of combustible gases, measuring the change in electromotive force produced in electric conductor by the burning of substantially all of a known amount of said gases in the vicinity of said conductor.

14. In a method of quantitative determination of combustible gases, measuring the change in electromotive force produced in electric conductor by the burning of substantially all of a known amount of said gases with the aid of a catalyst in close proximity to said conductor.

15. In a method of quantitative testing of low concentrations of combustible gases, ascertaining the change in electromotive force produced in a thermo-couple by passing said gases over a catalyst in the vicinity of one of the junctions of said thermo-couple.

16. In a method of quantitative determination of gases, measuring the change in electromotive force produced in a thermo-couple by burning substantially all of the combustible material of said gases in the vicinity of one of the junctions of said thermo-couple.

17. In a method of quantitative determination of gases, measuring the change in electromotive force produced in a thermo-couple by burning substantially all of the combustible material of said gases with the aid of a catalyst in the vicinity of one of the junctions of said thermo-couple.

18. A method of quantitative determination of combustible gases comprising preheating said gases and ascertaining the change in electromotive force produced in a thermo-couple by passing a known amount of said heated gases over a catalyst in the vicinity of one of the junctions of said thermo-couple.

19. A method of quantitative determination of low concentrations of combustible gases comprising passing said gases over a thermo-junction, then over a second thermo-junction in close proximity to a catalyst and ascertaining the difference in potential between said junctions.

20. A method of quantitative determination of low concentrations of combustible gases comprising heating said gases and passing same over a thermo-junction, then over a second thermo-junction in close proximity to a catalyst and ascertaining the difference in potential between said junctions.

21. A method of quantitative determination of combustible gases comprising passing a known amount of said gases over a thermo-junction, then over a second thermo-junction in close proximity to a catalyst and ascertaining the difference in potential between said junctions.

22. A method of quantitative determination of combustible gases comprising heating said gases and passing a known amount of same over a thermo-junction, then over a second thermo-junction in close proximity to a catalyst and ascertaining the difference in potential between said junctions.

23. A method of quantitative determination of combustible gases comprising heating a known amount of said gases and passing same over a thermo-junction and then over another thermo-junction in close proximity to heated catalytic material in sufficient amount to completely burn the combustible matter of the gases passing over the same and ascertaining the difference in potential between said junctions.

24. A method of quantitative determination of gases comprising passing the gases over a thermo-junction, then burning substantially all of the combustible matter in said gases by passing said gases over a catalyst in the vicinity of a second thermo-junction and ascertaining the difference in potential between said junctions.

25. A method of quantitative determination of gases comprising heating the gases and passing same over a thermo-junction, then burning substantially all of the combustible material in said gases by passing said gases over a platinum catalyst in the vicinity of another thermo-junction and ascertaining the difference in potential between said junctions.

26. An apparatus for testing gases comprising a gas conduit, a plurality of thermo-junctions within said conduit and catalytic material in close proximity to one of said junctions.

27. An apparatus for testing gases comprising a gas conduit, means for heating gases in said conduit, a plurality of thermo-junctions within said conduit and catalytic material in close proximity to one of said junctions.

28. An apparatus for testing gases comprising a gas conduit, means for preheating the gases entering said conduit and maintaining the gases at a high temperature in said conduit, a plurality of thermo-junctions within said conduit and catalytic material in close proximity to one of said junctions.

29. An apparatus for testing gases comprising a gas conduit, a pair of thermo-junctions, catalytic material in close proximity to one of said junctions and means for measuring the difference in potential between said junctions.

30. An apparatus for testing gases comprising a gas conduit, means for heating gases in said conduit, a pair of thermo-junctions, catalytic material in close proximity to one of said junctions and means for measuring the difference in potential between said junctions.

31. An apparatus for testing gases comprising a gas conduit, means for preheating the gases entering said conduit and maintaining the gases at a high temperature in said conduit, a pair of thermo-junctions, catalytic material in close proximity to one of said junctions and means for measuring the difference in potential between said junctions.

32. An apparatus for testing gases comprising a gas conduit, means for preheating the gases entering said conduit and maintaining the gases at a high temperature in said conduit, a pair of thermo-junctions, catalytic material in close proximity to one of said junctions and means for measuring the difference in potential between said junctions.

33. An apparatus for testing gases comprising a thermo-junction and means for continuously giving quantitative indications of gases passing over said thermo-junction.

34. An apparatus for testing gases comprising a thermo-junction, catalytic material in close proximity to said thermo-junction and means for continuously giving quantitative indications of gases passing over said thermo-junction.

35. An apparatus for testing gases comprising a thermo-junction, catalytic material in close proximity to said thermo-junction, means for heating said gases before coming in contact with said thermo-junction and means for continuously giving quantitative indications of gases passing over said thermo-junction.

36. An apparatus for testing gases comprising a thermo-junction, means for bringing gases in the vicinity of said thermo-junction, and means for continuously giving quantitative indications of gases passing over said thermo-junction.

37. An apparatus for testing gases comprising a gas conduit, a plurality of thermo-junctions within said conduit, catalytic material in close proximity to one of said junctions, and means for continuously giving quantitative indications of gases passing over said thermo-junctions.

38. An apparatus for testing gases comprising a gas conduit, means for pre-heating the gases entering the said conduit and maintaining the gases at a high temperature in said conduit, a plurality of thermo-junctions within said conduit, catalytic material in close proximity to one of said junctions, and means for continuously giving quantitative indications of gases passing over said thermo-junctions.

ARTHUR B. LAMB.
ALFRED T. LARSON.